United States Patent
Wang et al.

(10) Patent No.: US 7,423,970 B2
(45) Date of Patent: Sep. 9, 2008

(54) CROSS-LAYER RATE ADAPTATION MECHANISM FOR WLAN

(75) Inventors: Li-Chun Wang, Hsinchu (TW); Kuang-Nan Yen, Hsinchu (TW); Ming-Bing Chen, Hsinchu (TW); Wei-Cheng Liu, Hsinchu (TW); Yu-Ren Yang, Hsinchu (TW); Ping-Jung Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 141 days.

(21) Appl. No.: 11/249,397

(22) Filed: Oct. 14, 2005

(65) Prior Publication Data

US 2006/0215561 A1    Sep. 28, 2006

(30) Foreign Application Priority Data

Mar. 25, 2005    (TW) ............... 94109476 A

(51) Int. Cl.
*G01R 31/08* (2006.01)
*H04Q 7/20* (2006.01)

(52) U.S. Cl. .................. 370/235; 370/338
(58) Field of Classification Search ......... 370/230–235, 370/338; 455/452.2; 714/749–750
See application file for complete search history.

(56) References Cited

U.S. PATENT DOCUMENTS

| | | | |
|---|---|---|---|
| 2002/0168993 A1 | 11/2002 | Choi et al. | |
| 2003/0022686 A1 | 1/2003 | Soomro et al. | |
| 2003/0133427 A1 | 7/2003 | Cimini et al. | |
| 2004/0017790 A1 | 1/2004 | del Prado et al. | |
| 2004/0086058 A1 | 5/2004 | Eckhardt et al. | |
| 2006/0187885 A1* | 8/2006 | Roy et al. .................. 370/332 |
| 2006/0198305 A1* | 9/2006 | Hamdi ...................... 370/232 |

FOREIGN PATENT DOCUMENTS

| | | |
|---|---|---|
| CN | 1543081 | 11/2004 |
| WO | WO 03/075503 | 9/2003 |

OTHER PUBLICATIONS

Ad Kamerman, et al., "WaveLAN®-II: A High-Performance Wireless LAN for the Unlicensed Band." Bells Labs Technical Journal, Jul. 1997.

Julian Cheng, et al., "Maximum-Likelihood Based Estimation of the Nakagami *m* Parameter." IEEE Communication Letters, vol. 5, No. 3, Mar. 2001.

(Continued)

*Primary Examiner*—Lee Nguyen
(74) *Attorney, Agent, or Firm*—Harness, Dickey & Pierce P.L.C.

(57) ABSTRACT

A cross-layer rate adaptation mechanism for wireless local area network (WLAN) can obtain the channel state by calculating the $E_b/N_0$ ratio of ACK frame transmitted from the receiver side. The mechanism determines the transmission rate of the next frame by referring to a predefined reduced mode table. When receiving an ACK frame fails, the mechanism can automatically lower the transmitting rate of the next transmission. Therefore, the method can reduce the damage to the system when ACK frame failure happens.

7 Claims, 7 Drawing Sheets

OTHER PUBLICATIONS

Julian Cheng, et al., "Generalized Moment Estimators for the Nakagami Fading Parameter." IEEE Communications Letters, vol. 6, No. 4, Apr. 2002.

Young-Chai Ko, et al., "Estimation of Nakagami-$m$ Fading Channel Parameters With Application to Optimized Transmitter Diversity Systems." IEEE Transactions on Wireless Communications, vol. 2, No. 2, Mar. 2003.

Daji Qiao, et al. "Miser: An Optimal Low-Energy Transmission Strategy for IEEE 802.11 a/h." Sep. 2003.

Wei-Cheng Liu, et al., "Physical Layer Effects on the MAC Goodput Performance for the Rate Adaptive IEEE 802.11 a/g WLAN." 2004 IEEE, Apr. 2003.

Office Action dated Sep. 7, 2007 for corresponding Chinese Application No. 2005100633611.

* cited by examiner

| transmission rate (Mbps) | modulation technology | code rate |
|---|---|---|
| 6 | BPSK | 1/2 |
| 9 | BPSK | 3/4 |
| 12 | QPSK | 1/2 |
| 18 | QPSK | 3/4 |
| 24 | 16-QAM | 1/2 |
| 36 | 16-QAM | 3/4 |
| 48 | 64-QAM | 2/3 |
| 54 | 64-QAM | 3/4 |

FIG.2

| data rate (Mbps) | 6 | 9 | 12 | 18 |
|---|---|---|---|---|
| S/N ratio ($E_b/N_0$) (dB) | 11.05 | 15.16 | 10.85 | 15.26 |
| data rate (Mbps) | 24 | 36 | 48 | 54 |
| S/N ratio ($E_b/N_0$) (dB) | 13.18 | 18.27 | 19.15 | 21.90 |

FIG.3

| PHY mode | 1 | 2 | 3 | 4 | 5 |
|---|---|---|---|---|---|
| data rate (Mbps) | 12 | 24 | 36 | 48 | 54 |
| threshold of $E_b/N_0$ (dB) | 10.85 | 13.18 | 18.27 | 19.15 | 21.90 |
| operation range (dB) | [0,13.18) | [13.18,18.27) | [18.27,19.15) | [19.15,21.90) | [21.90, ∞) |

FIG.4

CROSS-LAYER RATE ADAPTATION MECHANISM FOR WLAN

PRIORITY STATEMENT

This Non-provisional application claims priority under 35 U.S.C. § 119(a) on Patent Application No(s). 94109476 filed in Taiwan on Mar. 25, 2005, the entire contents of which are hereby incorporated by reference.

BACKGROUND

1. Field of Invention

The invention relates to a transmission rate adjusting method in a wireless local area network (WLAN) and, in particular, to a cross-layer rate adaptation mechanism for WLAN in a communication system with multiple sets of transmission rates, which selects one transmission rate from several transmission rates in the physical layer (PHY) through a medium access control (MAC) layer.

2. Related Art

Wireless communications utilize radio waves to achieve signal transmissions. It has developed for long time and has been used in widely many aspects, including military purposes, navigations, aviation, and scientific researches. Using wireless communications in public communication services is very recent. The introduction of the honeycomb mobile communication technology has further facilitated the applications of wireless communications in daily life.

In the past few years, wireless communications have made tremendous progress. Its popularity has been increased by a factor that is far larger than the accumulated usage in last few decades. The basic reasons are that in addition to technological advances, the trend of commercialized global communications results in a free, competitive market and cheap, good products.

Integrating wireless technology with networks is also a mainstream in the modern development. According to their covered transmission ranges, the current wireless network can be categorized into four types: the wireless wide area network (WWAN), the wireless metropolitan area network (WMAN), the wireless local area network (WLAN), and the wireless personal area network (WPAN)

The wireless communications have brought the convenience in our lives, and also made the wireless local area networks almost as popular as the conventional wired Internet (e.g. the Ethernet). Therefore, many scholars have devoted to the study for the field. The main function of the wireless local area network is to provide high data rate transmissions. The transmission rate has been as fast as 54 Mbps. Using the wireless network to access the Internet enables people to enjoy the convenience. Therefore, they are particular suitable for uses at homes, conference rooms, offices, airports, and restaurants.

The standard for wireless local area networks has been evolved from the early IEEE 802.11b to the current IEEE 802.11a/g. In a wireless environment, how to adopt the most suitable modulation technology for data transmissions according to the state variation of the channels is the most important issue in the field. In the past, there were a lot of related techniques for adapting transmission rate. They can be roughly classified into three types according to their properties. The first type includes the methods proposed, for example, by Lucent and AMD, which is designed according to whether a transmission is successful without worrying about the channel links. The most famous technique is the AutoRate Fallback (ARF) mechanism proposed by Bell Lab in 1997 and adopted in the WaveLAN-II network card produced by Lucent. WaveLAN-II adopts the IEEE 802.11 standard, supporting both 1 Mbps and 2 Mbps transmission rates. The ARF mechanism switches between the two transmission rates (1 Mbps and 2 Mbps) according to the value of a counter, which counts the numbers of successful ACK frame or failure times. If the transmitting end does not receive correct ACK frames in consecutive two times, the system restarts the counter and lowers the rate for the next transmission. When the transmitting end successfully receives the ACK frame for tens times, the system raises the transmission rate and restarts the counter. Obviously, the ARF mechanism does not have a sufficiently fast reaction time to adjust the transmission rate according to the variation of the wireless channel. Moreover, the transmission rate adaptation method proposed by AMD, the Transmission Statistics, also uses whether a transmission is successful as the criterion. The second type includes the Rate-dependent Packet Shaping method proposed by AT&T. The transmission rate varies with the length of the transmitted data. Its purpose is to restrict that each transmission time is the same, and it achieves fairness for the use of the wireless channels. The third type is designed according to the link quality; different transmission rate thresholds are established according to the state of the wireless channel. Most of these techniques are proposed by Philips. For example, the state of link quality can be obtained from several factors such as the received signal strength (RSS), the noise margin, or the path loss. The system evaluates the quality of the previous link and then adjusts the transmission rate according to the thresholds of different transmission rate. However, the operation of the above-mentioned mechanisms depends on a basic assumption that a signal is successfully transmitted. If a transmission fails, the system loses the information of the link quality and cannot make any rate adjustment.

SUMMARY OF THE INVENTION

Accordingly, the present invention is directed to a cross-layer rate adaptation mechanism for rapidly adjusting the transmission rate in accord with the channel variation, and to a compensation mechanism to substantially solve the problems in the prior art.

The disclosed cross-layer rate adaptation mechanism for wireless local area network (WLAN) includes the steps of: establishing a reduced mode table at physical layer (PHY); determining whether acknowledge (ACK) frame is successfully received; evaluating an $E_b/N_0$ ratio of the received ACK frame if the ACK frame is successfully received, and transmitting next packet relative to one of transmission rates according to the reduced mode table; or transmitting the packet again at a transmission rate lower than the previous transmission rate according to a compensation mechanism if the received ACK frame fails.

BRIEF DESCRIPTION OF THE DRAWINGS

The invention will become more fully understood from the detailed description given herein below illustration only, and thus are not limitative of the present invention, and wherein:

FIG. 2 is a table of transmission rates, modulation technologies, and coding rate under the IEEE 802.11a standard according to the embodiment of the invention;

FIG. 3 is a table of the required S/N ratios with the criterion that the PER is less than 10% under the Nakagami fading channel with m=1 and 100 ns root-mean square (RMS) delay spread according to the embodiment of the invention;

FIG. 4 is a reduced mode table for the IEEE 802.11a standard according to the embodiment of the invention;

DETAILED DESCRIPTION OF THE INVENTION

Figure 1:
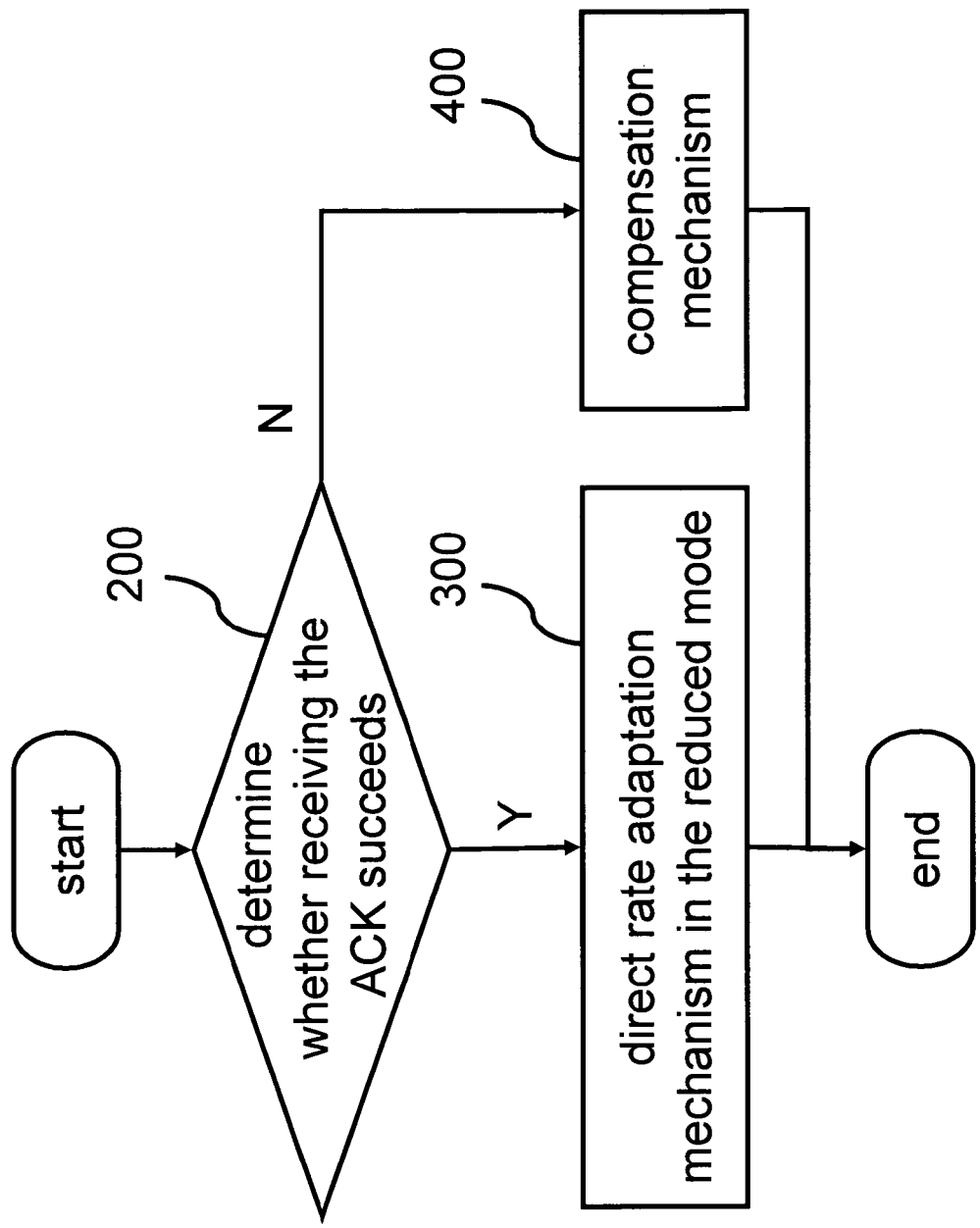
FIG. 1 is a flowchart of a cross-layer rate adaptation mechanism for WLAN according to an embodiment of the invention.

FIG. 1 is a flowchart of the cross-layer rate adaptation mechanism for WLAN according to an embodiment of the invention. In particular, different mechanisms are used to determine the rate of the next transmission according to whether the transmitting end successfully receives an ACK frame.

As shown in FIG. 1, the medium access control (MAC) layer of the transmitting end is used to determine whether receiving the ACK frame succeeds (step 200). When the ACK frame is successfully received, the MAC layer adopts the direct rate adaptation mechanism in the reduced mode to determine a transmission rate for next packet (step 300). When receiving the ACK frame fails, the MAC layer adopts a compensation mechanism to determine the transmission rate for retransmitting the next packet (step 400). In the following, the direct rate adaptation mechanism in the reduced mode, the step 300, as shown in FIG. 1, on the left and the compensation mechanism, the step 400, as shown in FIG. 1, are described step by step.

Consider a wireless transmission system with several transmission rates. For example of IEEE 802.11a standard, because it is a communication system with several transmission rates, as shown in FIG. 2, its physical layer (PHY) is defined in eight data rates with modulation technologies and coding rates, such as 6 Mbps, 9 Mbps, 12 Mbps, 18 Mbps, 24 Mbps, 36 Mbps, 48 Mbps, and 54 Mbps. According to the IEEE 802.11a standard, its tolerable packet error rate (PER) is about 10%. Further, the channel mode of multiple paths is considered as follows:

$$h_k = N\left(0, \frac{1}{2}\sigma_k^2\right) + jN\left(0, \frac{1}{2}\sigma_k^2\right), \quad \sigma_k^2 = \sigma_0^2 e^{-kT_S/T_{RMS}}, \text{ and}$$

$$\sigma_0^2 = 1 - e^{-T_S/T_{RMS}};$$

wherein $$N\left(0, \frac{1}{2}\sigma_k^2\right)$$

represents a zero mean Gaussian random variable with variance $$\frac{1}{2}\sigma_k^2.$$

Moreover, $T_S$ is the sampling period, $T_{RMS}$ represents the root-mean-square (RMS) delay spread of the channel. A Nakagami-m channel model is constructed with this multiple path channel and the line-of-sight signal component. Furthermore, in the Rayleigh (i.e. Nakagami-m channel for m=1) channel, the required signal-to-noise (S/N) ratios ($E_b/N_0$) for the requested PER corresponding to eight PHY modes are evaluated, as shown in FIG. 3. Referring to FIG. 3, when the data rate is 24 Mbps, the required S/N ratio ($E_b/N_0$) is smaller than those required by the data rates of 9 Mbps and 18 Mbps. Thus, the data rates of 9 Mbps and 18 Mbps are inefficient for the IEEE 802.11a standard. Likewise, the data rates of 6 Mbps and 12 Mbps have similar S/N ratios ($E_b/N_0$). Therefore, the transmission in the PHY mode of 6 Mbps is unnecessary, and can be replaced by the one of 12 Mbps rate. From the above discussions, the PHY modes of 12 Mbps, 24 Mbps, 36 Mbps, 48 Mbps, and 54 Mbps are used as data transmission rates for the IEEE 802.11a standard. Since some inefficient PHY mode rates are eliminated, this mechanism is thus called a reduced-mode direct rate adaptation mechanism. In addition, a reduced mode table is acquired accordingly, as shown in FIG. 4, and contains five PHY modes (PHY mode=1, 2, 3, 4, and 5), with the required S/N ratios ($E_b/N_0$) corresponding to the transmission rates of 12 Mbps, 24 Mbps, 36 Mbps, 48 Mbps, and 54 Mbps, respectively. Moreover, the operation ranges of the S/N ratios ($E_b/N_0$) for individual transmission rates are listed in FIG. 4.

Figure 5:
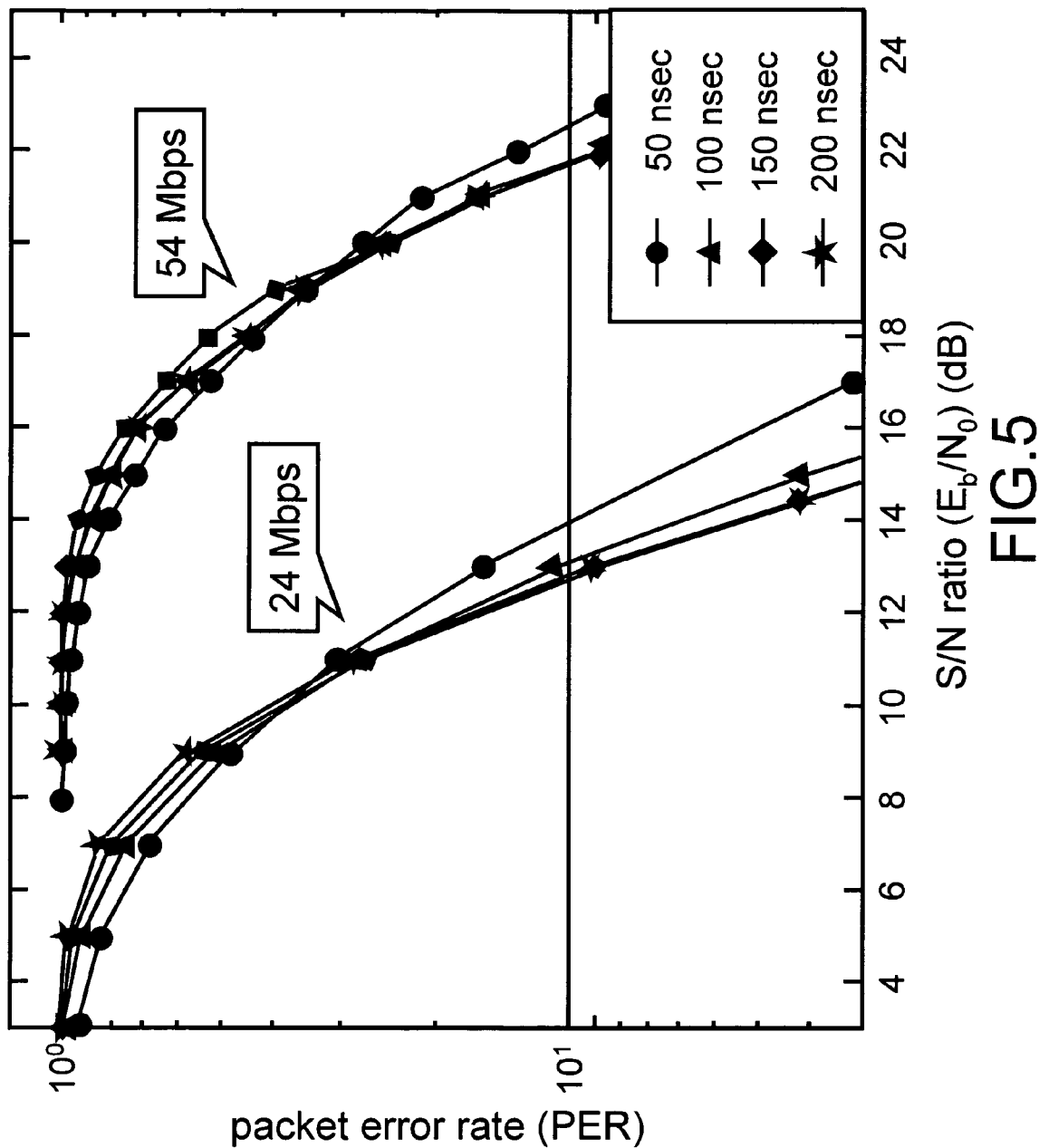
FIG. 5 shows simulated curves of the PER and the corresponding S/N ratio for different RMS delayed extensions in the IEEE 802.11a standard according to the embodiment of the invention.

In a wireless environment, the channel is time-varying and has multiple paths. In the following, the influence of the parameter for the RMS delay spread $T_{RMS}$ is discussed. For a fixed PER, the simulation results for different RMS delay spread are shown in FIG. 5. As shown in the figure, the required S/N ratios ($E_b/N_0$) with 10% PER criterion for different RMS delay spread are very close. The variation is less than 2 dB. Therefore, the delay spread of 100 nsec is adequate for the general reduced mode table.

Figure 6:
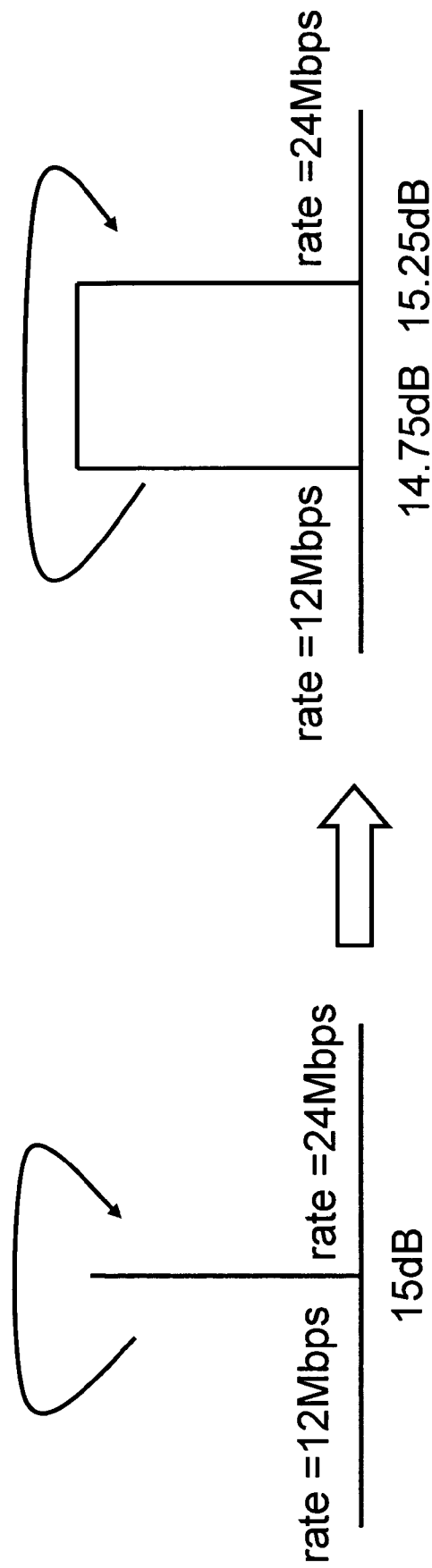
FIG. 6 is a schematic view of the threshold utilizing the hysteresis effect under the IEEE 802.11a standard according to the embodiment of the invention.

For the small differences in the reduced mode table in different delayed extension environments, the way to use the hysteresis effect is proposed to achieve fine-tuning and avoid the ping-pong effect at the boundary regions. The hysteresis effect, as shown in FIG. 6, is as follows. Suppose a threshold of the S/N ratio ($E_b/N_0$) for switching between the data transmission rates of 12 Mbps and 24 Mbps is 15 dB. In tradition, once the S/N ratio of the received ACK frame is greater than 15 dB, the transmission rate is switched from 12 Mbps to 24 Mbps. However, if the S/N ratio falls around 15 dB, it will result in the ping-pong effect switching back and forth between 12 Mbps and 24 Mbps. Therefore, a threshold of 0.5 dB hysteresis is added. When the S/N ratio ($E_b/N_0$) of the ACK frame is greater than 15 dB, the switch is not performed immediately. Instead, the switch is withheld until the S/N ratio is greater than 15.25 dB.

Figure 7:
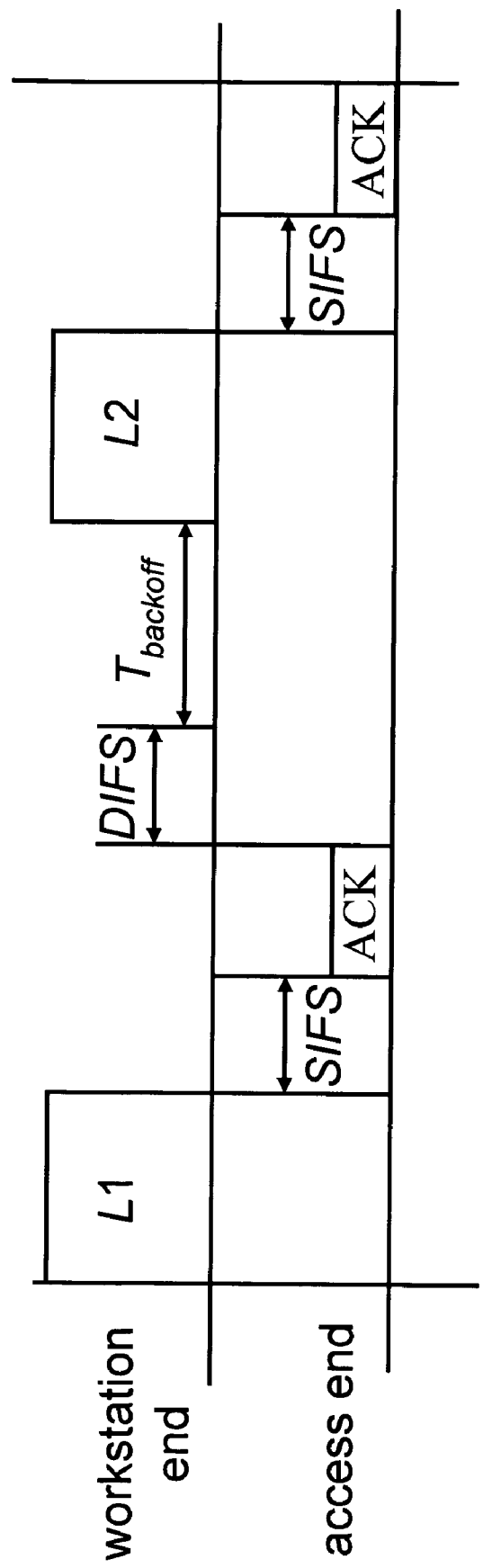
FIG. 7 shows the duration for adjusting the transmission rate using the direct rate adaptation mechanism in the reduced mode under the IEEE 802.11a standard according to the embodiment of the invention.

In the following, the time required for the direct rate adaptation mechanism in the reduced mode is analyzed. As shown in FIG. 7, using the data length of L1 transmitted from the transmitting end, the returned ACK frame length, the waiting time SIFS for the receiving end to return the ACK frame, the waiting time DIFS for the transmitting end to make the next transmission, the delayed access time $T_{backoff}$ for the transmitting end to wait, the data length of L2 transmitted by the transmitting end, and initial transmission rate of R1, an adjusted transmission rate of R2, and the time required to return the ACK frame of $T_{ACK}$, one obtain the total time as follows:

$$\text{total time} = \frac{L1}{R1} + \frac{L2}{R2} + 2 \times T_{ACK} + 2 \times SIFS + DIFS + T_{backoff}$$

Refer to the compensation mechanism shown on the right-hand side of FIG. 1. When receiving the ACK frame fails, the channel information (the S/N ratio of the ACK frame) is lost. The compensation mechanism provides a method that lowers the transmission rate until the next retransmission is successful. The following gives two mechanisms for reducing the transmission rates.

The first compensation mechanism is bottom-up rate adaptation. Once receiving the ACK frame fails, the transmission rate for the next retransmission is returned to the lowest PHY mode (initial value). For example, the transmitting end transmits the data at the data transmission rate of 54 Mbps (PHY =5) and the receiving end does not response (or receiving the ACK frame fails), then the data transmission rate of the next retransmission goes back to 12 Mbps (PHY =1).

In the second compensation mechanism, when receiving the ACK frame fails, the transmitting end gradually reduces the next retransmission rate. For example, when the transmitting end transmits the data at the data transmission rate of 54 Mbps (PHY =5) and receiving the ACK frame fails, the next transmission rate is 48 Mbps (PHY =4).

As mentioned above, the direct rate adaptation mechanism in the reduced mode according to the invention is faster than other conventional mechanisms, such as the ARF mechanism of WaveLAN-II, for adjusting the transmission rate. When the transmission quality of the channel is sufficiently good, the time for increasing from the smallest initial rate to the maximum according to the direct rate adaptation mechanism in the reduced mode only requires one communication transmission time, whereas the ARF mechanism of WaveLAN-II requires 19 times more time. This is because the ARF mechanism has to receive 10 times of successful ACK frame before its transmission rate is upgraded by one level and there are four levels from the smallest rate to the largest rate. Therefore, the direct rate adaptation mechanism in the reduced mode according to the invention is more efficient in responding to the channel state variation than the conventional methods.

According to the invention, the transmission rate is adjusted mainly according to the link quality of the channels. Therefore, the way for rapidly adjusting the transmission rate is provided. The quality of transmission links is determined by the S/N ratio of the received ACK frame. The reduced mode provid an efficient way in selecting the transmission rate for data transmissions. Besides, the difference of tolerable S/N ratios in the wireless fading channels with different delay spread is very small. Therefore, we can adopt the reduced mode table in the Rayleigh fading channel for an arbitrary transmission environment. If receiving the ACK frame fails, there is also a solution. The disclosed compensation mechanism compensates the information loss due to transmission failure.

The invention will be obvious that the same may be varied in many ways. For example, the invention is not restricted to the IEEE 802.11a standard, but applicable to the communication system with multiple sets of transmission rates. Such variations are not regarded as a departure from the spirit and scope of the invention, and all such modifications would be obvious to one skilled in the art are intended to be included within the scope of the following claims.

What is claimed is:

1. A cross-layer rate adaptation mechanism for wireless local area network (WLAN), applied to a channel, comprising:

predetermining a packet error rate;

establishing a reduced mode table at a physical layer (PHY) of a transmitting end when the packet error rate is met, wherein the reduced mode table includes a plurality of transmission rates of the physical layer and a plurality of corresponding signal-to-noise (S/N) ratios;

transmitting a packet from a medium access control (MAC) layer of the transmitting end to a receiving end at an initial transmission rate;

determining whether an acknowledge (ACK) frame from the receiving end is successfully received through the medium access control layer of the transmitting end;

evaluating an signal-to-noise ratio of the ACK frame by the medium access control layer of the transmitting end when the ACK frame is successfully received, and transmitting other packets according to an adjusted transmission rate corresponding to the evaluated signal-to-noise ratio; and transmitting the next packet at an adjusted transmission rate lower than a previous transmission rate from the transmitting end when receiving the ACK frame fails, wherein when the ACK frame is successfully received, the total time required for transmitting the next packet at the adjusted transmission rate is that $$\text{total time} = \frac{L1}{R1} + \frac{L2}{R2} + 2 \times T_{ACK} + 2 \times SIFS + DIFS + T_{backoff},$$

wherein L1 is a data length of a first frame packet, SIFS is a waiting time before the receiving end returns the ACK frame, DIFS is a waiting time before the transmitting end makes the next transmission, $T_{backoff}$ is a delayed access time for the transmitting end to wait, L2 is a data length of a second frame packet, R1 is the initial transmission rate, R2 is the adjusted transmission rate, and $T_{ACK}$ is a time required for transmitting the ACK frame with a data length.

2. The mechanism of claim 1, wherein the step of establishing a reduced mode table at a physical layer of a transmitting end comprises the steps of:

employing a standard of a wireless transmission system with a plurality of transmission rates;

evaluating a plurality of signal-to-noise ratio corresponding to the transmission rates in the standard when the packet error rate is satisfied; and determining a plurality of transmission efficiencies of the signal-to-noise ratios based on the signal-to-noise ratios, and using at least one of the signal-to-noise ratios with the preferable transmission efficiency and the corresponding transmission rate thereof to establish the reduced mode table.

3. The mechanism of claim 1, wherein the initial transmission rate is the lowest one of the transmission rates in the reduced mode table.

4. The mechanism of claim 1, wherein when receiving the ACK frame fails, the lowest one of the transmission rates in the reduced mode table acts as a compensation rate for re-transmitting the next packet.

5. The mechanism of claim 1, wherein when receiving the ACK frame fails, the adjusted transmission rate at a level lower than the previous transmission rate in the reduced mode table acts as a compensation rate for re-transmitting the next packet.

6. The mechanism of claim 1, wherein the channel is selected from the group consisting of Rayleigh, Rician, and Nakagami-m channel models.

7. The mechanism of claim 1, wherein in the step of transmitting the next packet at an adjusted transmission rate lower than a previous transmission rate from the transmitting end when the receiving ACK frame fails, the adjusted transmission rate is acquired by adjusting the previous transmission rate according to a threshold utilizing a hysteresis effect.

* * * * *